US011167381B2

(12) United States Patent
Saez et al.

(10) Patent No.: US 11,167,381 B2
(45) Date of Patent: Nov. 9, 2021

(54) CLAMP SYSTEM AND METHOD FOR CONTROL OF WELDING A FIRST SUBSTRATE TO A SECOND SUBSTRATE

(71) Applicant: GM Global Technology Operations LLC, Detroit, MI (US)

(72) Inventors: Miguel A Saez, Clarkston, MI (US); John P. Spicer, Plymouth, MI (US); Spyros P Mellas, Waterford, MI (US); Richard J Skurkis, Lake Orion, MI (US); Pei-chung Wang, Troy, MI (US); James W Wells, Rochester Hills, MI (US); Wayne Cai, Troy, MI (US); Dooil Hwang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 43 days.

(21) Appl. No.: 16/778,885

(22) Filed: Jan. 31, 2020

(65) Prior Publication Data
US 2021/0237211 A1 Aug. 5, 2021

(51) Int. Cl.
*B23K 37/04* (2006.01)
*G05B 19/402* (2006.01)
*B23K 101/00* (2006.01)

(52) U.S. Cl.
CPC ........ *B23K 37/0435* (2013.01); *G05B 19/402* (2013.01); *B23K 2101/006* (2018.08); *G05B 2219/49015* (2013.01)

(58) Field of Classification Search
CPC .......... B23K 2101/006; B23K 37/0435; G05B 2219/49015; G05B 19/402
See application file for complete search history.

(56) References Cited

U.S. PATENT DOCUMENTS

| 2003/0196991 | A1* | 10/2003 | Gobez | B23K 11/043 |
| | | | | 219/97 |
| 2015/0375327 | A1* | 12/2015 | Becker | G06T 1/00 |
| | | | | 345/440 |
| 2016/0125762 | A1* | 5/2016 | Becker | G09B 19/24 |
| | | | | 434/234 |

\* cited by examiner

*Primary Examiner* — Kidest Bahta
(74) *Attorney, Agent, or Firm* — Vivacqua Crane, PLLC (57) ABSTRACT

A clamp system and method for measurement and control of welding a first substrate to a second substrate is provided. The system comprises a squeeze clamp having to a first end and a second end. The system further comprises a motor connected to the squeeze clamp such that the first and second ends are movable to clamp the first substrate to the second substrate. The system further comprises at least one of an electromagnetic flux sensor, a current sensor, a position sensor, and a gap sensor disposed on one of the first and second ends for determining a first measured variable between the first and second substrates. The system further comprises a controller to control the motor to clamp the first substrate to the second substrate based on the first measured variable. The controller is in communication with the electromagnetic flux sensor, the current sensor, and the gap sensor.

14 Claims, 4 Drawing Sheets

CLAMP SYSTEM AND METHOD FOR CONTROL OF WELDING A FIRST SUBSTRATE TO A SECOND SUBSTRATE

INTRODUCTION

The present disclosure relates to methods and systems for welding workpieces of motor vehicles, and more particularly to methods and systems having a welding apparatus for control of welding a first substrate to a second substrate.

Automotive sheet metal and structural welding is a fabrication process that joins components by using heat to melt the material of components and allowing them to cool and fuse together. In gas metal arc welding, a sound weld is affected by the location of substrates to be welded along with the gap therebetween. Moreover, part variations, clamping, and transient distortion may result in discrepant weld during gas metal arc welding, for example.

SUMMARY

Thus, while current welding system and methods achieve their intended purpose, there is a need for a new and improved system and method for control of welding a first substrate to a second substrate.

One aspect of the present disclosure improves process control since a gap at which welding the first and second substrates occur can be controlled and measured in real time. Process flexibility is also improved since the system may be robot mounted and moved to different positions under programmable control. This aspect allows for reduced dedicated tooling and reduced weight of robot end effectors.

Aspects of present disclosure provide a system and method to define a position of a motor and clamping elements based on sensor inputs during a squeeze clamp action for a welding operation. The system and method allow for real-time adjustments to control a gap between substrate materials, resulting in improved quality of welding. The system and method may have a plurality of control strategies, each of which may be used together or separately during a squeeze clamp action for a welding operation.

According to several aspects of the present disclosure, a clamp system for measurement and control of welding a first substrate to a second substrate is provided. In one aspect, the system comprises a squeeze clamp having a first arm extending to a first end and a second arm extending to a second end. In this embodiment, the first and second ends are in opposing relationship to position the first substrate to the second substrate. In this embodiment, the system further comprises a motor connected to the first and second arms such that the first and second ends are movable to clamp the first substrate to the second substrate. At least one of an electromagnetic flux sensor, a current sensor, a position sensor, and a gap sensor is disposed on one of the first and second ends for determining a first measured variable between the first and second substrates.

It is understood that the system may include other suitable sensors, such as a force sensor to measure contact force, an ohmmeter to measure contact resistance, a digital camera to area or line scan, a laser-based gap sensor, or a capacitive displacement sensor to measure gap width without departing from the scope or spirit of the present disclosure.

In this embodiment, the system comprises a controller programmed for controlling the motor to clamp the first substrate to the second substrate based on the first measured variable. The controller is in communication with the motor and the at least one of the electromagnetic flux sensor, the current sensor, and the gap sensor.

In one embodiment, the first measured variable comprises at least one of magnetic flux, current, torque, and distance between the first and second substrates.

In another embodiment, the at least one of the electromagnetic flux sensor, the current sensor, and the gap sensor is disposed on one of the first and second ends for determining a second measured variable between one of the first and second substrates and one of the first and second ends. In this embodiment, the second measured variable comprises at least one of magnetic flux, current, torque, and distance between one of the first and second substrates and one of the first and second ends.

In another embodiment, the controller is programmed for stopping the motor to cease clamping when the first measured variable changes at a first predetermined threshold or percent of the first measured variable. In one embodiment, the first predetermined threshold is about 10 percent of the first measured variable.

In yet another embodiment, the controller is programmed for controlling the motor to contact one of the first and second substrates with one of the first and second ends when the second measured variable changes at a second predetermined threshold or percent of the second measured variable. In one embodiment, the second predetermined threshold is about 10 percent of the second measured variable.

In still another embodiment, the controller is programmed for controlling the motor to retract the squeeze clamp from at least one of the first and second substrates after welding the first and second substrates.

In another aspect of the present disclosure, a method of controlling a system for welding a first substrate to a second substrate is provided. In one example, the method comprises providing a system for welding the first substrate to the second substrate. In this embodiment, the system comprises a squeeze clamp having to a first end and a second end. The system further comprises a motor connected to the squeeze clamp such that the first and second ends are movable to clamp the first substrate to the second substrate. The system further comprises at least one of an electromagnetic flux sensor, a current sensor, a position sensor, and a gap sensor disposed on one of the first and second ends for determining a first measured variable between the first and second substrates and for determining a second measured variable between one of the first and second substrates and one of the first and second ends. The system further comprises a controller programmed for controlling the motor to clamp the first substrate to the second substrate based on the measured variable. The controller is in communication with the at least one of the electromagnetic flux sensor, the current sensor, and the gap sensor.

In this example, the method comprises positioning the first substrate with the second substrate to a clamping position defining a gap between the first substrate and the second substrate. The method further comprises clamping the first and second substrates to reduce the gap between the first and second substrates. In this example, the method further comprises determining the measured variable. The method further comprises stopping the motor to cease clamping when the first measured variable changes at a first predetermined percent. Furthermore, the method further comprises welding the first substrate to the second substrate and retracting the squeeze clamp after welding the first and second substrates, after welding.

In one example, the method further comprises approaching one of the first substrate and the second substrate, before clamping the first and second substrates and determining the second measured variable. The method further comprises contacting at least one of the first substrate and the second substrate when the second measured variable changes at a second predetermined percent of the second measured variable.

In another example, the first measured variable comprises at least one of magnetic flux, current, torque, and distance between the first and second substrates.

In yet another example, the second measured variable comprises at least one of magnetic flux, current, torque, and distance between one of the first and second substrates and one of the first and second ends. The first predetermined threshold or percent may be about 10 percent of the second measured variable. Furthermore, the second predetermined threshold may be about 10 percent of the second measured variable.

In yet another aspect of the present disclosure, a method of controlling a system for welding a first substrate to a second substrate is provided. In this aspect, the method comprises providing a system for welding the first substrate to the second substrate.

In this example, the system comprises a squeeze clamp having a first arm extending to a first end and a second arm extending to a second end. The first and second ends are in opposing relationship to position the first substrate to the second substrate. The system further comprises a motor connected to the first and second arms such that the first and second ends are movable to clamp the first substrate to the second substrate. In this example, the system comprises at least one of an electromagnetic flux sensor, a current sensor, a position sensor and a gap sensor disposed on one of the first and second ends for determining a first measured variable between one of the first and second substrates and one of the first and second ends and a second measured variable between one of the first and second substrates and one of the first and second ends. In this example, the system further comprises a controller programed for controlling the motor to clamp the first substrate to the second substrate based on the measured variable. The controller is in communication with the motor and the at least one of the electromagnetic flux sensor, the current sensor, and the gap sensor.

In this example, the method comprises positioning the first substrate with the second substrate to a clamping position defining a gap between the first substrate and the second substrate. The method further comprises approaching one of the first substrate and the second substrate with the squeeze clamp, before clamping the first and second substrates and then determining the second measured variable with the at least one of the electromagnetic flux sensor, the current sensor, and the gap sensor.

In this example, the method further comprises contacting at least one of the first substrate and the second substrate with the squeeze clamp when the second measured variable changes at a second predetermined percent of the second measured variable. The method comprises clamping the first and second substrates with the motor and the squeeze clamp to reduce the gap between the first and second substrates and then determining the measured variable with the at least one of the electromagnetic flux sensor, the current sensor, and the gap sensor.

In this aspect, the method comprises stopping the motor to cease clamping when the first measured variable changes at a first predetermined percent. The method further comprises welding the first substrate to the second substrate and then retracting the squeeze clamp after welding the first and second substrates, after welding.

In another example of this aspect, the first measured variable comprises at least one of magnetic flux, current, torque, and distance between the first and second substrates.

In another example, the second measured variable comprises at least one of magnetic flux, current, torque, and distance between one of the first and second substrates and one of the first and second ends. In one example, the first predetermined threshold or percent is about 10 percent. In another example, the second predetermined percent is about 10 percent.

In one example, the system may be used in truck frame rail clamshell welding. Rather than using a dedicated series of multiple squeezer clamps, to squeeze two halves of a truck rail together, one system of the present disclosure may only use only a single squeezer clamp that is mounted on a robot. The robot may move the squeezer clamp to a specific position and squeezes the parts together in a predetermined local area. Next, a welder may join the parts together with a "tack weld," for example, near the position of the squeezer clamp. After the tack-weld cools, the squeezer clamp is released and moved to another position to be welded. Hence, with (n) robot moves, the parts can be squeezed together and tack welded in (n) places, where (n) is the number of welds. In this example, the robot is programmed to move, squeeze and weld in a different number of positions.

In yet another example and without departing from the spirit or scope of the present disclosure, one system of the present disclosure may be used with a plurality of squeezer clamps by way of the method described herein to enable more intelligent control over the squeezing process.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure provides a system and method to define a position of a motor and/or clamping elements based on sensor inputs during a squeeze clamp action for a welding operation. The motor may be a servo motor for closing a gap between substrate materials. The system may be fixed or robot mounted. The system and method allow for real-time adjustments to control a gap between substrate materials, resulting in improved quality of welding. The system and method may have a plurality of control strategies, each of which may be used together or separately during a squeeze clamp action for a welding operation.

In one embodiment, the system has a servo-motor position control loop based on a measured variable such as magnetic flux, where the gap is a function of gap between substrate materials in a welding operation. The system may have a mode selection algorithm that enables switching between different control strategies such as position/force/electromagnetic flux control (or a combination thereof) to enable a hybrid and complementary control strategy.

Figure 1A:
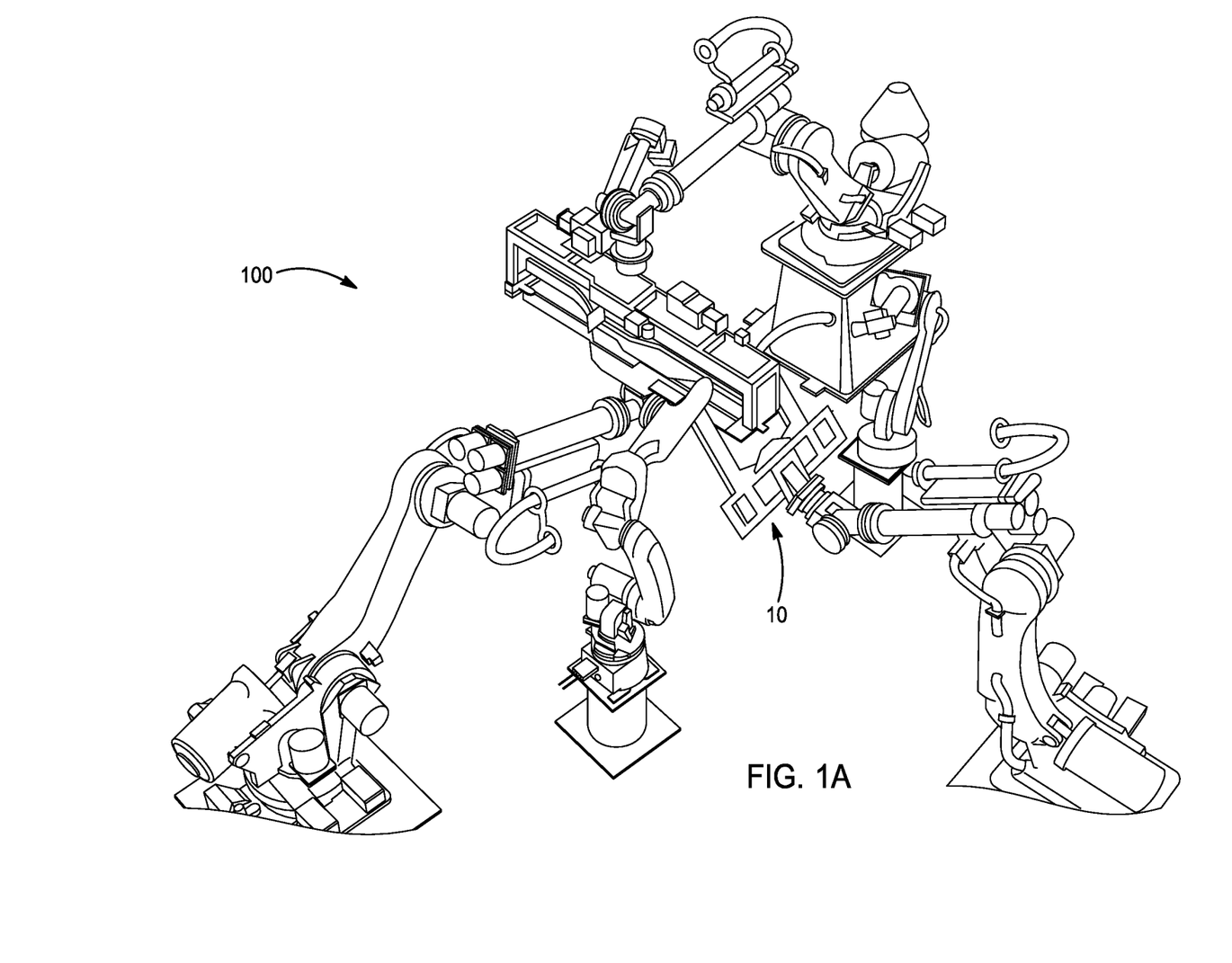
FIG. 1A is a schematic view of a robotic system that may implement a clamp system for measurement and control of welding a first substrate to a second substrate in accordance with one embodiment of the present disclosure.
Figure 1B:
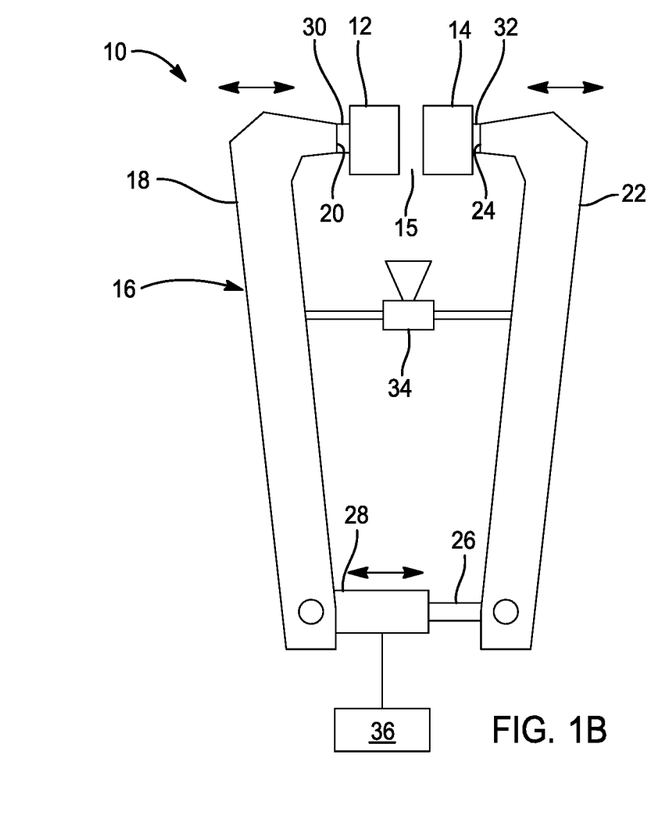
FIG. 1B is a side view of a squeeze clamp that may be used in the robotic system of FIG. 1A in accordance with one embodiment of the present disclosure.

In accordance with FIGS. 1A-1B, a robotic system 100 may implement a clamp system for measurement and control of welding a first substrate to a second substrate. In accordance with one embodiment, FIG. 1B depicts a clamp system 10 for measurement and control of welding a first substrate 12 to a second substrate 14. Moreover, the clamp system 10 (FIG. 1B) may be used in the robotic system 100 (FIG. 1A) for a truck frame rail assembly, for example. As shown in FIG. 1B, the clamp system 10 comprises a squeeze clamp 16 having a first arm 18 extending to a first end 20, and a second arm 22 extending to a second end 24. In this embodiment, the first and second ends 20, 24 are in opposing relationship to position the first substrate 12 to the second substrate 14 defining a gap 15. The first and second arms 18, 22 may be movably connected by way of a crossbar 26 on which a motor with an encoder 28, e.g. a servo motor with an encoder, is movably disposed. In one embodiment, the squeeze clamp may have a physical hard-stop mechanism included therein for prevent over-squeezing of the first and second substrates.

Moreover, each of the first and second ends may have a swiveling contact or swivel mechanism disposed thereto. The swiveling contact may allow for acceptable contact even when the squeeze clamp is not positioned normal to the first or second substrate. In this embodiment, the swivel contact allows for up to 15 degrees of an alignment discrepancy between the squeeze clamp and the first or second substrate.

In this example, the motor 28 is disposed on the crossbar 26 such that the first and second ends 20, 24 are movable to clamp the first substrate 12 to the second substrate 14. It is to be understood that the clamp system can have one or more contact points on each side without departing from the spirit or scope of the present disclosure. In one example, the system may have two contact points, spaced about 2 to 3 inches apart to hold the part in two places and allow for tack welding therebetween. In operation, the system may be robot-mounted (with or without a tool changer) or mounted stationary (e.g., on the floor).

It is to be understood that the clamp system 10 may be any suitable clamp system without departing from the spirit or scope of the present disclosure. For example, the clamp system may be a scissor ("X") type clamp or a "C" type clamp with a servo actuator. Moreover, the clamp system may be a "U" shape with direct-inline linear actuators or a clamp with tilting capability with swivel pads to enable clamping on angled surfaces.

At least one of an electromagnetic flux (EMF) sensor 30, a current sensor 32, a gap sensor 34, and a position sensor (e.g. an encoder for motor 28) is disposed on or adjacent to one of the first and second ends 20, 24 for determining a first measured variable (or a clamp variable) between the first and second substrates 12, 14. Each of the sensors mentioned above measures and verifies gap in-process. Moreover, a force sensor may be used to avoid overloading and a position sensor may also be used.

In this embodiment, the first measured variable comprises at least one of magnetic flux, current, torque, and distance between the first and second substrates 12, 14. Preferably, each of the EMF sensor 30, the current sensor 32, and the gap sensor 34 is disposed on or adjacent to one of the first and second ends 20, 24.

In this embodiment, each of the EMF sensor 30, the current sensor 32, and the gap sensor 34 is disposed on or adjacent to one of the first and second ends 20, 24 for determining a second measured variable (or a pre-clamp variable) between one of the first and second substrates 12, 14 and one of the first and second ends 20, 24. In this embodiment, the second measured variable comprises at least one of magnetic flux, current, torque, and distance between one of the first and second substrates 12, 14 and one of the first and second ends 20, 24.

The EMF sensor 30 may be any suitable electromagnetic flux sensor for measuring magnetic flux without departing from the spirit or scope of the present disclosure. The EMF sensor 30 may measure magnetic flux between the first and second ends 20, 24, between the first end 20 and the first substrate 12, and between the second end 24 and the second substrate 14. Moreover, the current sensor 32 may be any suitable current sensor for measuring current to the motor 28 without departing from the spirit or scope of the present disclosure. Furthermore, the gap sensor 34 may be any suitable gap sensor, e.g., a gap measurement camera with a laser, for measuring distance without departing from the spirit or scope of the present disclosure. The gap sensor 34 may measure distance between the first end 20 and the first substrate 12, between the second end 24 and the second substrate 14, and between the first and second ends 20, 24.

Figure 2:
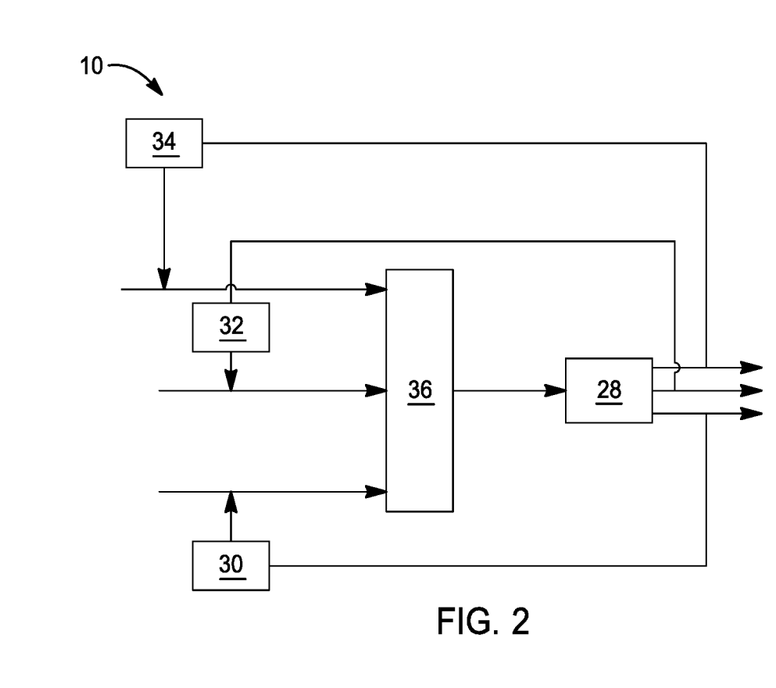
FIG. 2 is a schematic view of the clamp system in FIGS. 1A-1B according one embodiment.

In this embodiment, the clamp system 10 comprises a controller 36 programmed for controlling the motor 28 to actuate clamping the first substrate 12 to the second substrate 14 based on the first measured variable or clamp variable. As shown in FIGS. 1 and 2, the controller 36 is in communication with the motor 28 along with each of the EMF sensor 30, the current sensor 32, and the gap sensor 34. In one embodiment, the controller is programmed to actuate/control the motor and the squeeze clamp by way of an algorithm. Based on the algorithm, the controller may use one or more inputs from the EMF sensor, the current sensor, and the gap sensor to control the motor and the squeeze clamp.

The hard-stop mechanism mentioned above may be programmed in the controller by any suitable manner without departing from the spirit or scope of the present disclosure.

In operation, the controller 36 is programmed to actuate the motor 28 to have the first and second ends 20, 24 approach the first and second substrates 12, 14 for contact and subsequent clamping. In this embodiment, during the approach, the sensor detects the pre-clamp variable (second measured variable). When a change in the pre-clamp variable occurs, contact between the ends 20, 24 and the substrates 12, 14 is confirmed. The change in the pre-clamp variable indicates contact between the end 20, 24 and substrates 12, 14. Such change in the pre-clamp variable may be represented a percent change. In one embodiment, the percent change in the pre-clamp variable may be about 10 percent or more.

As mentioned, the controller 36 is programmed for controlling the motor 28 to actuate clamping the first substrate 12 to the second substrate 14 based on the first measured variable (the clamp variable). That is, the controller 36 actuates the motor 28 to further move the first and second ends 20, 24 inward, thereby clamping the first and second substrates 12, 14. In this embodiment, the sensor detects the clamp variable (first measured variable) and sends input data to the controller. When a predetermined change in the clamp variable occurs, clamping of the substrates 12, 14 is confirmed. Such predetermined change in the clamp variable may be represented by a percent change. In one embodiment, the percent change in the clamp variable may be about 10 percent or less.

During operation, one sensor may be used to detect the first measured variable (clamp variable) and the second measured variable (pre-clamp variable). However, it is to be understood that one, two, or all of the sensors may be used without departing from the spirit or scope of the present disclosure.

When the clamp variable changes at a clamp threshold, the controller 36 is programmed to actuate the motor 28 to stop further clamping and hold the position of the squeeze clamp for welding. The clamp threshold may be represented as a percent of clamp variable. In one embodiment, the clamp threshold may be greater than a 10 percent change of the clamp variable.

After welding, the controller 36 actuates the motor 28 to retract the first and second ends 20, 24 from the first and second substrates 12, 14, respectively. Thus, the controller 36 is programmed for controlling the motor 28 to retract the squeeze clamp 16 from at least one of the first and second substrates 12, 14 after welding the first and second substrates.

In another aspect of the present disclosure, a method 110 of controlling a system for welding a first substrate to a second substrate is provided. As shown, the method 110 comprises providing a system (see FIGS. 1 and 2 for example) for measurement and control of welding a first substrate to a second substrate 14 in box 112. The clamp system 10 illustrated in FIGS. 1B and 2 is one example of such system that may carry out the steps depicted in FIG. 3. However, it is understood that other suitable systems and apparatus may be used to carry out the steps of the method 110 without departing from the spirit or scope of the present disclosure.

As described above, the clamp system 10 comprises the squeeze clamp 16 having the first arm 18 extending to the first end 20 and the second arm 22 extending to the second end 24. In this example, the first and second ends 20, 24 are in opposing relationship to position the first substrate 12 to the second substrate 14, defining the gap 15. The first and second arms 18, 22 may be movably connected by way of the crossbar 26 on which the motor 28, e.g. a servo motor, is movably disposed. In this example, the motor 28 is disposed on the crossbar 26 such that the first and second ends 20, 24 are movable to clamp the first substrate 12 to the second substrate 14. Furthermore, the clamp system 10 comprises the controller 36 programmed for controlling the motor 28 to actuate clamping the first substrate 12 to the second substrate 14 based on the first measured variable. As shown in FIGS. 1 and 2, the controller 36 is in communication with the motor 28 along with each of the EMF sensor 30, the current sensor 32, and the gap sensor 34.

Figure 3:
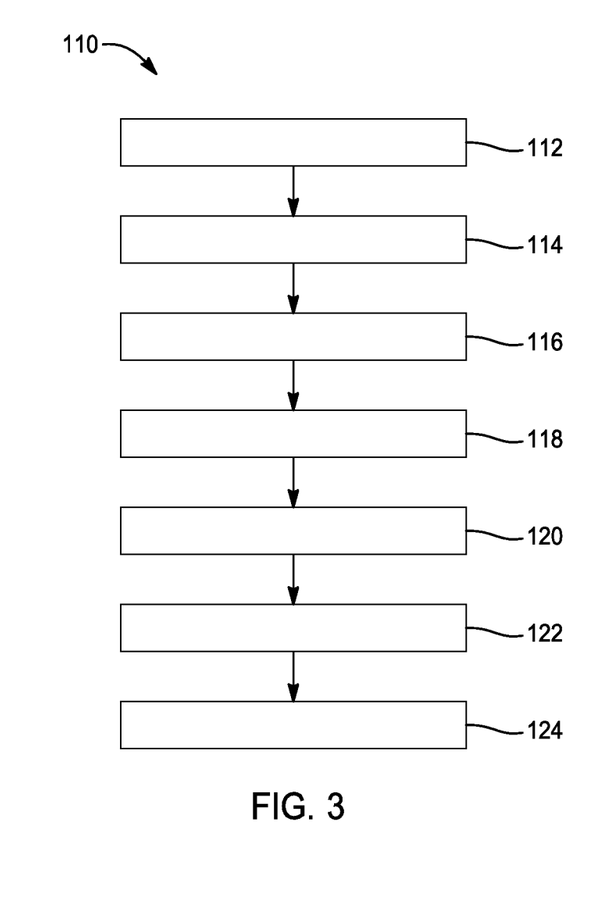
FIG. 3 is a flowchart depicting a method of controlling a system for welding a first substrate to a second substrate in accordance with one example of the present disclosure.

In this example, the method 110 comprises positioning the first substrate with the second substrate to a clamping position defining a gap between the first substrate and the second substrate in box 114. The first and second substrates may be disposed in the clamping position manually or by robotic assist or by any other suitable manner without departing from the scope or spirit of the present disclosure.

The method 110 further comprises clamping the first and second substrates to reduce the gap 15 between the first and second substrates in box 116. Preferably, the controller 36 is programmed for actuating the motor 28 to move the first and second ends to contact the first and second substrates, respectively, and hence commence clamping.

The method 110 further comprises determining the first measured variable in box 118. As mentioned above, at least one of the sensors (i.e., the EMF sensor, the current sensor, or the gap sensor) detects/senses the first measured variable between the first and second substrates. In turn, the controller receives input data from sensor and determines the first measured variable by way of an algorithm. In this example, the gap sensor measures the gap distance and sends input data to the controller which determines the first measured variable. However, any or all of the sensors may be used without departing from the scope or spirit of the present disclosure.

When the first measured variable changes at the first predetermined threshold (or by a first predetermined percent), the method 110 further comprises ceasing actuation of the motor by way of the controller in box 120 to stop further clamping. That is, during clamping, the gap sensor continues to detect the first measured variable and sends input data to the controller. When the predetermined threshold is reached, the controller sends a signal to the motor to cease further actuation or movement. Further clamping is ceased, and the first and second substrates are held in position by the squeeze clamp for welding.

Furthermore, the method 110 comprises welding the first substrate to the second substrate in box 122. After welding, the method 110 further includes retracting the squeeze clamp from the first and second substrates in box 124. Retracting the squeeze clamp may be accomplished by way of the controller sending an actuation signal to the motor to reverse its position and thereby retract the first and second ends from the first and second substrates, respectively.

Figure 4:
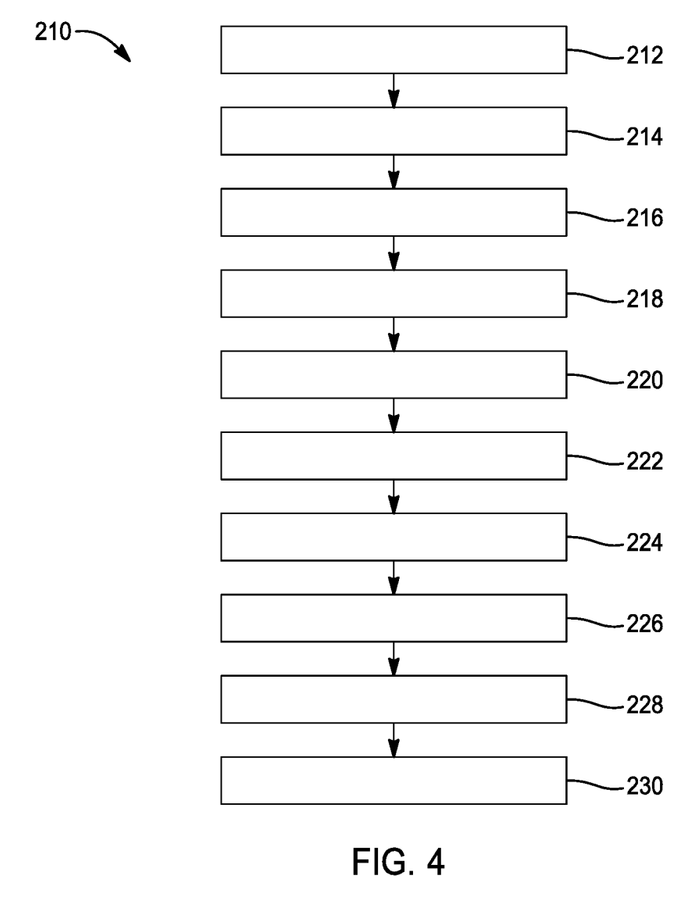
FIG. 4 is a flowchart depicting a method of controlling a system for welding in accordance to another example of the present disclosure.

Referring to FIG. 4, a method 210 of controlling a system for welding a first substrate to a second substrate is provided. In this aspect, the method 210 comprises providing a system for welding the first substrate to the second substrate in box 212. The system illustrated in FIGS. 1 and 2 is one example of such system that may carry out the steps depicted in FIG. 4. However, it is understood that other suitable systems and apparatus may be used to carry out the steps of the method without departing from the spirit or scope of the present disclosure.

In this example, the method 210 comprises positioning the first substrate with the second substrate to a clamping position in box 214 defining the gap 15 between the first substrate and the second substrate. The first and second substrates may be disposed in the clamping position manually or by robotic assist or by any other suitable manner without departing from the scope or spirit of the present disclosure.

Figure 5:
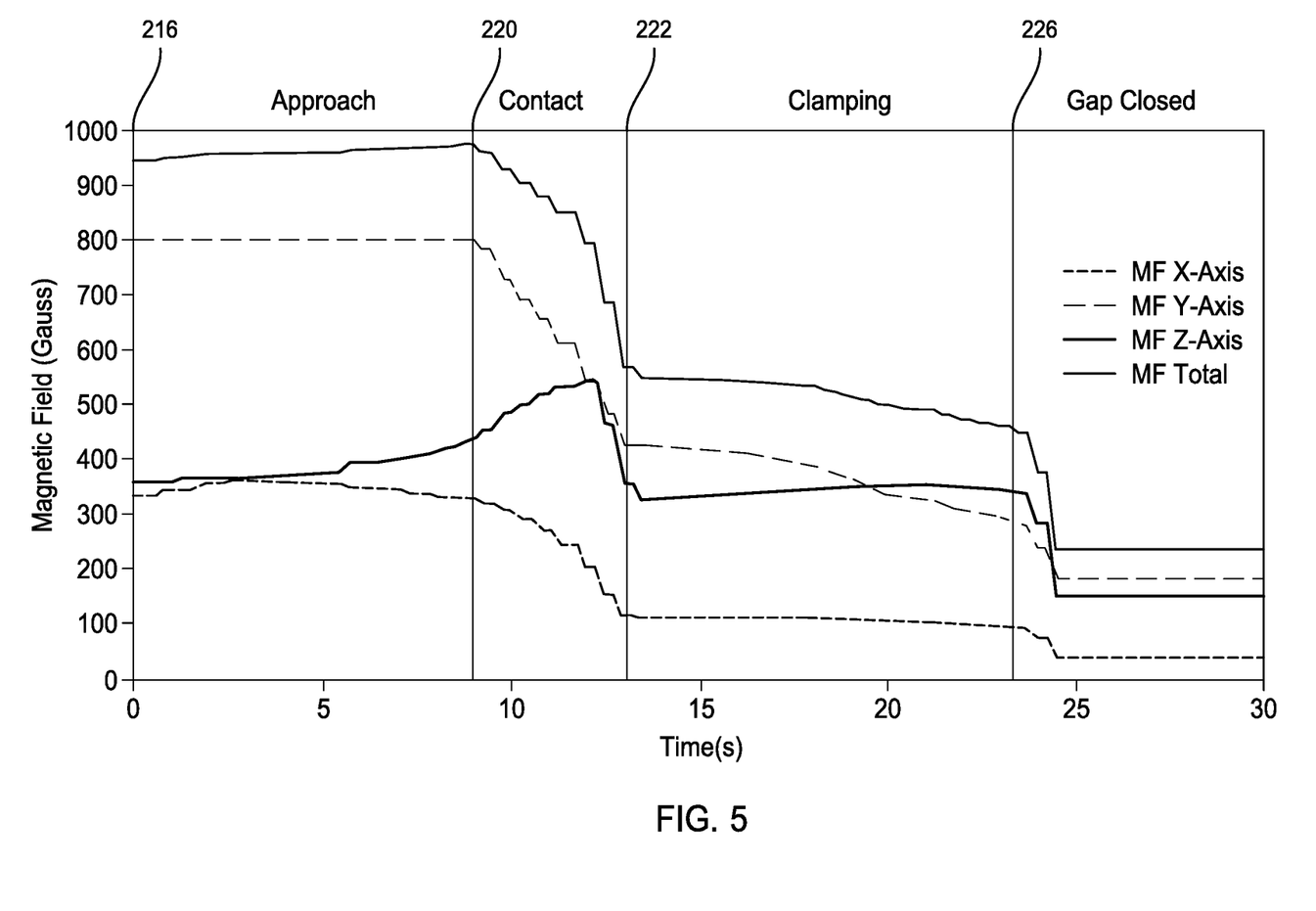
FIG. 5 is a graph depicting magnetic field vs. time during a welding operation in accordance with one example of the present disclosure.

As depicted in FIGS. 4 and 5, the method 210 further comprises approaching one of the first substrate and the second substrate with the squeeze clamp in box 216. In this example, the controller 36 is programmed to actuate the motor 28 to have the first and second ends 20, 24 approach the first and second substrates 12, 14 for clamping.

In this example, upon the step of approaching, the EMF sensor detects the magnetic flux (the pre-clamp variable) between the first end and the first substrate and sends input data to the controller which determines the pre-clamp variable (here, magnetic flux) in box 218. It is to be understood that one, two, or all of the sensors may be used to detect the second measured variable. As depicted in FIG. 5 and in this example, the magnetic field is generally constant at about 800 Gauss on the y-axis during the step of approaching.

In this example (FIG. 4), when the pre-clamp variable changes at the pre-clamp threshold (or by a predetermined percent), the method 210 further comprises contacting the first substrate and the second substrate with the squeeze clamp in box 220. Referring to FIG. 5, as the EMF sensor continues to detect the magnetic field between the first end and the first substrate, input data is sent to the controller which determines the magnetic field. When a predetermined change in the pre-clamp variable occurs, contact between the first end and the first substrate is confirmed. That is, the change in the pre-clamp variable indicates contact between the first end and the first substrate. Such change in the pre-clamp variable may be represented by a percent change. In one example, the percent change in the pre-clamp variable may be about 10 percent or more.

Referring to FIG. 4, the method 210 further comprises clamping the first and second substrates with the motor and the squeeze clamp in box 222 to reduce the gap 15. In this example, upon the step of contacting, the EMF sensor detects the magnetic field between the first and second substrates and sends input data to the controller. The controller, by way of algorithm, determines the first measured variable (clamp variable) in box 224. In an example shown in FIG. 5, when the first measured variable reaches a predetermined reduced change in magnetic flux, clamping of the first and second substrates is confirmed.

In this aspect, the method 210 comprises stopping the motor to cease further clamping in box 226. In the example shown in FIG. 5, when the first measured variable changes at a first predetermined threshold, and the gap is considered closed. The method 210 further comprises welding the first substrate to the second substrate in box 228 and then retracting the squeeze clamp in box 230 after welding the first and second substrates. Retracting the squeeze clamp may be accomplished by way of the controller sending an actuation signal to the motor to reverse its position and thereby retract the first and second ends from the first and second substrates, respectively.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A clamp system for measurement and control of welding a first substrate to a second substrate, the system comprising:
   a squeeze clamp having a first arm extending to a first end and a second arm extending to a second end, the first and second ends being in opposing relationship to position the first substrate to the second substrate;
   a motor connected to the first and second arms such that the first and second ends are movable to clamp the first substrate to the second substrate;
   at least one of an electromagnetic flux sensor, a current sensor, a position sensor, and a gap sensor disposed on one of the first and second ends for determining a first measured variable between the first and second substrates; and
   a controller programmed for controlling the motor to clamp the first substrate to the second substrate based on the first measured variable, the controller being in communication with the motor and the at least one of the electromagnetic flux sensor, the current sensor, and the gap sensor.

2. The system of claim 1 wherein the first measured variable comprises at least one of magnetic flux, current, torque, and distance between the first and second substrates.

3. The system of claim 1 wherein the at least one of the electromagnetic flux sensor, the current sensor, and the gap sensor is disposed on one of the first and second ends for determining a second measured variable between one of the first and second substrates and one of the first and second ends.

4. The system of claim 3 wherein the second measured variable comprises at least one of magnetic flux, current, torque, and distance between one of the first and second substrates and one of the first and second ends.

5. The system of claim 1 wherein the controller is programmed for stopping the motor to cease clamping when the first measured variable changes greater than 10 percent of the first measured variable.

6. The system of claim 4 wherein the controller is programmed for controlling the motor to contact the one of the first and second substrates with one of the first and second ends when the second measured variable changes greater than 10 percent of the second measured variable.

7. The system of claim 1 further comprising a robot being movable along the first and second substrates and in communication with the controller, the squeeze clamp being movably connected to the robot to clamp the first and second substrates for welding the first and second substrates.

8. A method of controlling a system for welding a first substrate to a second substrate, the method comprising:
   providing a system for welding the first substrate to the second substrate, the system comprising:
      a squeeze clamp having a first end and a second end;
      a motor connected to the squeeze clamp such that the first and second ends are movable to clamp the first substrate to the second substrate;
      at least one of an electromagnetic flux sensor, a current sensor, a position sensor and a gap sensor disposed on one of the first and second ends for determining a first measured variable between the first and second substrates and for determining a second measured variable between one of the first and second substrates and one of the first and second ends; and
      a controller programmed for controlling the motor to clamp the first substrate to the second substrate based on the measured variable, the controller being in communication with the at least one of the electromagnetic flux sensor, the current sensor, and the gap sensor;
   positioning the first substrate with the second substrate to a clamping position defining a gap between the first substrate and the second substrate;
   clamping the first and second substrates to reduce the gap between the first and second substrates;
   determining the measured variable;

stopping the motor to cease clamping when the first measured variable changes greater than 10 percent of the first measured variable;

welding the first substrate to the second substrate; and retracting the squeeze clamp after welding the first and second substrates.

9. The method of claim 8 further comprising:

approaching one of the first substrate and the second substrate, before clamping the first and second substrates;

determining the second measured variable;

contacting at least one of the first substrate and the second substrate when the second measured variable changes greater than 10 percent of the second measured variable.

10. The method of claim 8 wherein the first measured variable comprises at least one of magnetic flux, current, torque, and distance between the first and second substrates.

11. The method of claim 8 wherein the second measured variable comprises at least one of magnetic flux, current, torque, and distance between one of the first and second substrates and one of the first and second ends.

12. A method of controlling a system for welding a first substrate to a second substrate, the method comprising:

providing a system for welding the first substrate to the second substrate, the system comprising:

a squeeze clamp having a first arm extending to a first end and a second arm extending to a second end, the first and second ends being in opposing relationship to position the first substrate to the second substrate;

a motor connected to the first and second arms such that the first and second ends are movable to clamp the first substrate to the second substrate;

at least one of an electromagnetic flux sensor, a current sensor, a position sensor, and a gap sensor disposed on one of the first and second ends for determining a first measured variable between one of the first and second substrates and one of the first and second ends and a second measured variable between one of the first and second substrates and one of the first and second ends; and a controller programed for controlling the motor to clamp the first substrate to the second substrate based on the measured variable, the controller being in communication with the motor and the at least one of the electromagnetic flux sensor, the current sensor, and the gap sensor;

positioning the first substrate with the second substrate to a clamping position defining a gap between the first substrate and the second substrate;

approaching one of the first substrate and the second substrate with the squeeze clamp, before clamping the first and second substrates;

determining the second measured variable with the at least one of the electromagnetic flux sensor, the current sensor, and the gap sensor;

contacting at least one of the first substrate and the second substrate with the squeeze clamp when the second measured variable changes greater than 10 percent of the second measured variable;

clamping the first and second substrates with the motor and the squeeze clamp to reduce the gap between the first and second substrates;

determining the measured variable with the at least one of the electromagnetic flux sensor, the current sensor, and the gap sensor;

stopping the motor to cease clamping when the first measured variable changes greater than 10 percent of the first measured variable;

welding the first substrate to the second substrate; and retracting the squeeze clamp after welding the first and second substrates.

13. The method of claim 12 wherein the first measured variable comprises at least one of magnetic flux, current, torque, and distance between the first and second substrates.

14. The method of claim 12 wherein the second measured variable comprises at least one of magnetic flux, current, torque, and distance between one of the first and second substrates and one of the first and second ends.

* * * * *